United States Patent
Agarwal et al.

(10) Patent No.: US 9,644,606 B2
(45) Date of Patent: May 9, 2017

(54) SYSTEMS AND METHODS TO REDUCE TOWER OSCILLATIONS IN A WIND TURBINE

(75) Inventors: Pranav Agarwal, Guilderland, NY (US); Charudatta Subhash Mehendale, Niskayuna, NY (US); Arne Koerber, Berlin (DE)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 934 days.

(21) Appl. No.: 13/538,161

(22) Filed: Jun. 29, 2012

(65) Prior Publication Data
US 2014/0003936 A1    Jan. 2, 2014

(51) Int. Cl.
F03D 7/02    (2006.01)

(52) U.S. Cl.
CPC ............ F03D 7/02 (2013.01); F03D 7/0224 (2013.01); F03D 7/0296 (2013.01); Y02E 10/723 (2013.01)

(58) Field of Classification Search
CPC ......... F03D 7/02; F03D 7/0224; F03D 7/0276
See application file for complete search history.

(56) References Cited

U.S. PATENT DOCUMENTS

| | | | |
|---|---|---|---|
| 7,317,260 B2 * | 1/2008 | Wilson | 290/44 |
| 7,692,322 B2 * | 4/2010 | Wakasa | F03D 7/0224 290/44 |
| 8,174,137 B2 * | 5/2012 | Skaare | 290/44 |
| 2008/0260514 A1 * | 10/2008 | Nielsen | F03D 7/0224 415/4.3 |
| 2009/0250932 A1 | 10/2009 | Egedal | |

FOREIGN PATENT DOCUMENTS

| | | |
|---|---|---|
| EP | 2103915 A1 | 9/2009 |
| WO | 2011000531 A2 | 1/2011 |
| WO | 2012003985 A1 | 1/2012 |

OTHER PUBLICATIONS

Argyris et al., Abstract: Static and Dynamic Investigations on Different Towers for Wind Turbines, SAO/NASA ADS, Jul. 1979; 2Pages.

Friedmann, Abstract : Aeroelastic Stability and Response Analysis of Large Horizontal-Axis Wind Turbines, Journal of Wind Engineering and Industrial Aerodynamics, vol. 5, Issues 3-4, May 1980; 2 Pages.

M.D. Pavel; An Investigation of the Rotor-Tower Instability of the KEWT Wind Turbine, Delft Aerospace—Memorandum M-879, Project No. 224.740-9854, Nov. 1999; 45 Pages.

(Continued)

Primary Examiner — Igor Kershteyn
Assistant Examiner — Justin Seabe
(74) Attorney, Agent, or Firm — John P. Darling

(57) ABSTRACT

Systems and methods to reduce tower oscillations in a wind turbine are presented. The method includes obtaining a rotor velocity. Furthermore, the method includes obtaining one or more parameters associated with a tower of the wind turbine. Further, the method includes determining a modified rotor velocity based on the one or more parameters. Moreover, the method includes determining a first pitch angle based on the modified rotor velocity. In addition, the method includes pitching one or more blades of the wind turbine based on the first pitch angle to reduce the tower oscillations.

1 Claim, 7 Drawing Sheets

(56) References Cited

OTHER PUBLICATIONS

Karl A. Stol et al., Individual Blade Pitch Control for the Controls Advanced Research Turbine (CART), Journal of Solar Energy Engineering, vol. 128, Issue 4, Nov. 2006; 3 Pages.
M. Geyler et al., Abstract : Robust Multivariable Pitch Control Design for Load Reduction on Large Wind Turbines, Journal of Solar Energy Engineering, vol. 130, Issue 3, Aug. 2008; 3 Pages.
S. Nourdine et al., Comparison of Wind Turbine LQG Controllers using Individual Pitch Control to Alleviate Fatigue Loads, 18th Mediterranean Conference on Control & Automation (MED); Jun. 23-25, 2010; pp. 1591-1596.
Wind Energy Technology Overview; Downloaded on Jun. 29, 2012 URL : http://windeis.anl.gov/documents/fpeis/maintext/Vol1/appendices/appendix_d/Vol2AppD_1.pdf; 44 Pages.
Leithead et al., "Analysis of Tower/Blade Interaction in the Cancellation of the Tower Fore-Aft Mode via Control", European Wind Energy Conference 2004, Nov. 22, 2004, London.

\* cited by examiner

SYSTEMS AND METHODS TO REDUCE TOWER OSCILLATIONS IN A WIND TURBINE

BACKGROUND

Embodiments of the present disclosure relate to wind turbines, and more particularly to reducing tower oscillations in wind turbines.

Modern wind turbines operate in a wide range of wind conditions. These wind conditions can be broadly divided into two categories—below rated speeds and above rated speeds. To produce power in these wind conditions, wind turbines may include sophisticated control systems such as pitch controllers and torque controllers. These controllers account for changes in the wind conditions and accompanying changes in wind turbine dynamics. For example, pitch controllers generally vary the pitch angle of rotor blades to account for the changes in wind conditions and turbine dynamics. During below rated wind speeds, wind power may be lower than the rated power output of the wind turbine. In this situation, the pitch controller may attempt to maximize the power output by pitching the rotor blades substantially perpendicular to the wind direction. Alternatively, during above rated wind speeds, wind power may be greater than the rated power output of the wind turbine. Therefore, in this case, the pitch controller may restrain wind energy conversion by pitching the rotor blades such that only a part of the wind energy impinges on the rotor blades. By controlling the pitch angle, the pitch controller thus controls the velocity of the rotor blades and in turn the energy generated by the wind turbine.

Along with maintaining rotor velocity, pitch controllers may also be employed to reduce tower oscillations. Tower oscillations or vibrations occur due to various disturbances, such as turbulence, inefficient damping, or transition between the two wind conditions. Moreover, the tower may vibrate along any degree of freedom. For example, the tower may vibrate in a fore-aft direction (commonly referred to as tower nodding), in a side-to-side direction (commonly referred to as tower naying), or along its longitudinal axis (commonly referred to as torsional vibration).

Tower nodding is usually caused by aerodynamic thrust and rotation of the rotor blades. Every time a rotor blade passes in front of the tower, the thrust of the wind impinging on the tower decreases. Such continuous variation in wind force may induce oscillations in the tower. Moreover, if the rotor velocity is such that a rotor blade passes over the tower each time the tower is in one of its extreme positions (forward or backward), the tower oscillations may be amplified. Typically, the oscillations in the fore-aft direction are automatically minimized due to aerodynamic damping. Aerodynamic damping relies on the fact that the top of the tower constantly oscillates in the fore-aft direction. When the top of the tower moves upwind (or forward), the rotor thrust is increased. This increase in rotor thrust pushes the tower back downwind. The downwind push in turn aids in dampening the tower oscillations. Similarly, when the top of the tower moves downwind, the rotor thrust may be decreased. This decrease in rotor thrust pushes the tower back upwind. The upwind push also aids in dampening the tower oscillations.

Although aerodynamic damping aids in reducing oscillations considerably, if the rotor velocity is synchronized with the tower oscillations, the results may be detrimental for wind turbine components. In such instances, the tower may oscillate at a high rate causing mechanical strain and possible damage to the tower. Moreover, such synchronization may amplify the rotor velocity at tower resonance frequency, thereby potentially damaging generators and/or drivetrains connected to the rotor blades. As the amplification of tower oscillations is dependent on the rotor velocity, pitching the rotor to adjust its velocity may prevent amplification of the tower oscillations. Accordingly, by pitching the rotor blades, the pitch controller may control the rotor velocity and prevent amplification of the tower oscillations.

Typically, the pitch controller utilizes two separate control loops for the two functions—controlling the rotor velocity and reducing the tower oscillations. A rotor velocity control loop is employed to determine a pitch angle to control rotor velocity and a tower-damping control loop is used to compute a pitch angle to reduce tower oscillations. Often, these feedback loops operate relatively independently of each other. For example, the rotor velocity control loop may determine the pitch angle based on rotor velocity, wind speed, and current pitch angle. The tower-damping control loop, on the other hand, may determine the pitch angle based on tower deflection, tower top velocity, tower top acceleration, current pitch angle, and wind speed. Because of this independence, the currently available rotor velocity control loops may compute a pitch angle to maintain rotor speed that may disadvantageously induce tower oscillations instead of reducing them. Moreover, these rotor velocity control loops may cause energy amplification in the rotor near tower resonance frequencies. Such amplification may increase oscillations in the tower and increase the fatigue load placed on the wind turbine. Over time, such fatigue loads may reduce the life of wind turbine parts and increase the expenses associated with wind turbines.

BRIEF DESCRIPTION OF THE INVENTION

In accordance with aspects of the present disclosure, a method for reducing tower oscillations in a wind turbine is presented. The method includes obtaining a rotor velocity. Furthermore, the method includes obtaining one or more parameters associated with a tower of the wind turbine. Further, the method includes determining a modified rotor velocity based on the one or more parameters. Moreover, the method includes determining a first pitch angle based on the modified rotor velocity. In addition, the method includes pitching one or more blades of the wind turbine based on the first pitch angle to reduce the tower oscillations.

In accordance with another aspect of the present disclosure, a pitch control system is presented. The pitch control system includes a tower unit configured to determine one or more parameters associated with a tower of a wind turbine. Further, the pitch control system includes a decoupling unit configured to determine a modified rotor velocity based on the one or more parameters. Additionally, the pitch control system includes a controller configured to determine a first pitch angle based on the modified rotor velocity.

In accordance with yet another aspect of the present disclosure, a wind turbine is presented. The wind turbine includes a rotor having one or more rotor blades and a tower operatively coupled to the rotor. Further, the wind turbine includes a pitch control system for reducing tower oscillations in the wind turbine. The pitch control system includes a rotor unit configured to determine a rotor velocity, a tower unit configured to determine at least one of a tower top velocity and a second pitch angle, a decoupling unit configured to determine a modified rotor velocity based on at least one of the tower top velocity and the second pitch angle, and a controller configured to determine a first pitch angle based on the modified rotor velocity.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

The following terms, used throughout this disclosure, may be defined as follows:

Tower dynamics—refers to the mechanics concerned with the motion of a wind turbine tower under the action of various forces such as wind and rotor movement.

Rotor Dynamics—refers to the mechanics concerned with the motion of the rotor under the action of various forces such as wind, tower movement, and inertia.

Fore-aft oscillations—refers to tower oscillations in a direction parallel to the wind direction.

Tower top velocity—refers to the velocity of the tower oscillations experienced at the top end of a wind turbine tower.

Tower top acceleration—refers to the acceleration of the tower oscillations experienced at the top of the wind turbine tower.

Tower deflection—refers to the change in position of the top of the wind turbine tower with respect to a reference position.

Tower resonance—refers to the tendency of a wind turbine to oscillate with maximum amplitude at tower resonant frequencies.

First mode resonance frequency—refers to the resonant frequency of a first structural mode of the wind turbine tower where the mode dynamics are characterized by a second order spring-mass-damper system.

Embodiments of the present disclosure are related to an exemplary system and method for reducing tower oscillations in a wind turbine. More particularly, the present disclosure relates to an exemplary rotor velocity control loop that uses a pitch control system as an actuator. Moreover, the rotor velocity control loop determines a pitch angle that reduces tower oscillations. To this end, the rotor velocity control loop includes a decoupling unit that addresses the interdependence between rotor dynamics and tower dynamics using model based methods to reduce oscillations induced in the tower fore-aft direction at above rated speeds.

Moreover, embodiments of the present disclosure are described with reference to a land-based three-blade wind turbine. It will be understood, however, that such a reference is merely exemplary and that the systems and methods described here may just as easily be implemented in floating wind turbines, offshore wind turbines, 2-blade wind turbines, or 4-blade wind turbines without departing from the scope of the present disclosure.

Figure 1:
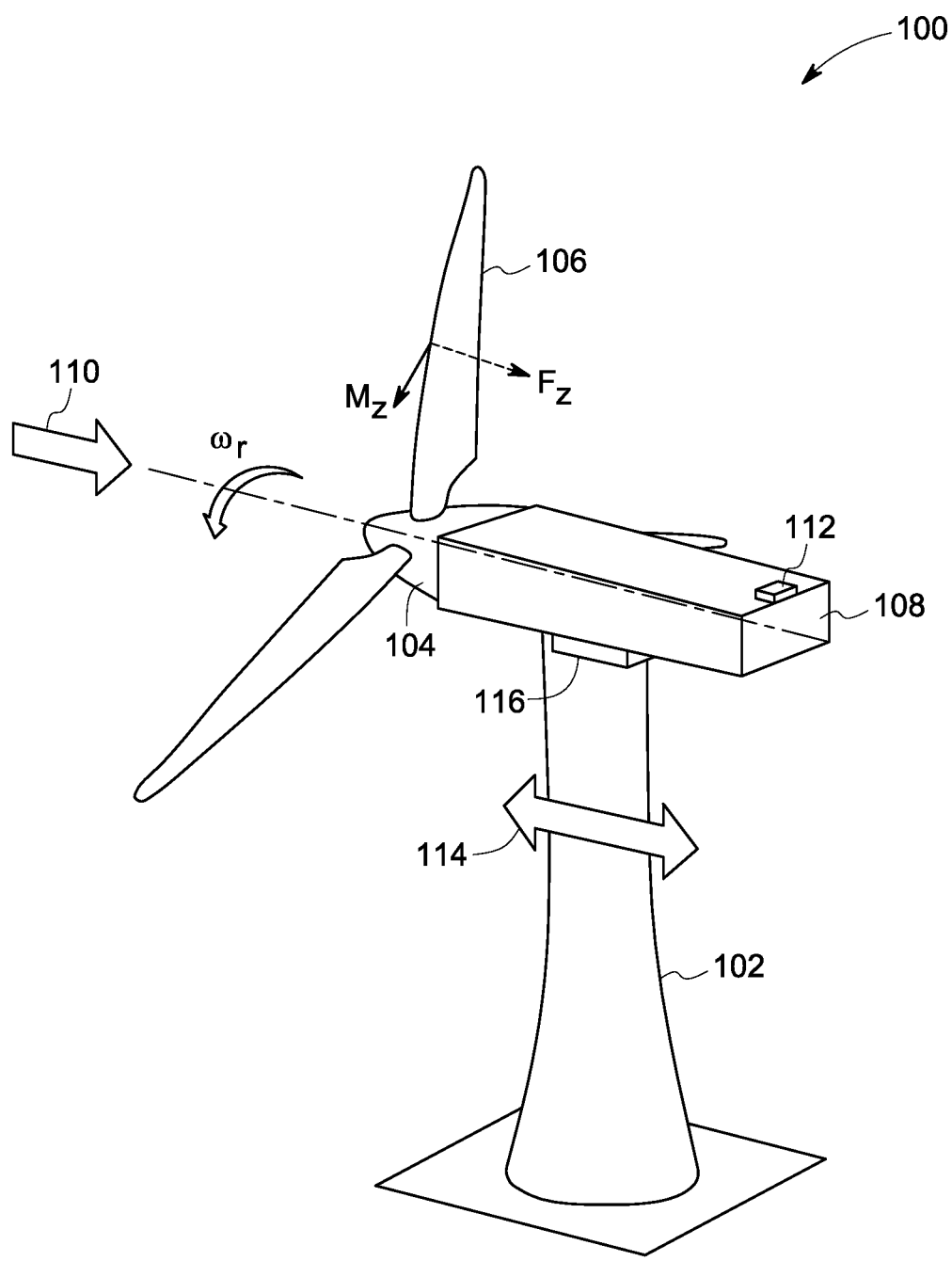
FIG. 1 is a diagrammatical representation of forces and motions experienced by a wind turbine.

FIG. 1 is a diagrammatical representation that illustrates forces and motions experienced by a wind turbine 100. The wind turbine 100 includes a tower 102, a rotor 104, one or more rotor blades 106, and a nacelle 108. The tower 102 may be coupled to the ground, to the ocean floor, or to a floating foundation using any known securing means, such as bolting, cementing, welding, and so on.

Further, in FIG. 1 reference numeral 110 is generally representative of wind. The wind 110 may have a mean speed ($\upsilon$). As the wind 110 blows in the indicated direction, an aerodynamic torque ($M_z$) is placed on the rotor blades 106 causing the rotor blades 106 to rotate in a direction that is substantially perpendicular to the wind direction. This motion of the rotor blades 106 is represented in FIG. 1 by an angular rotor velocity ($\omega_r$) of the rotating blades 106. Further, the nacelle 108 may include a gearbox (not shown) and a generator (not shown). The gearbox may increase the speed of the rotor blades 106 and the generator may convert the rotation of the rotor blades 106 into electricity, thus converting the energy of the wind 110 into electricity. Alternatively, the nacelle 108 may include a direct drivetrain (not shown). In such cases, inclusion of the gearbox may be circumvented.

Moreover, due to an aerodynamic thrust ($F_z$) of the wind 110 and the rotation of the rotor blades 106, the tower 102 may oscillate in a fore-aft direction. Reference numeral 114 is generally representative of the fore-aft oscillations. It will be understood that in addition to the fore-aft oscillations 114, the tower 102 may also experience other oscillations. Example oscillations include side-to-side oscillations, torsional oscillations, twisting oscillations, and the like. These oscillations are not illustrated in FIG. 1.

The wind turbine 100 may employ a sensing device to detect the fore-aft oscillations 114. For example, an oscillation velocity detector (not shown) or an oscillation deflection detector (not shown) may be employed. Alternatively, an accelerometer 112 may be employed in the wind turbine 100 to detect the acceleration of the fore-aft oscillations 114. In some embodiments, the accelerometer 112 may be disposed within the nacelle 108 or at the top of the tower 102. In other instances, the accelerometer 112 may be positioned at the center of the tower 102.

Furthermore, to reduce the fore-aft tower oscillations 114 and to control the rotor velocity, the wind turbine 100 may include an exemplary pitch control system 116 that may include a rotor velocity control loop (not shown). In some embodiments, the pitch control system 116 may also include a tower-damping control loop (not shown). Depending on the mean or effective speed of the incoming wind 110, the exemplary pitch control system 116 may be configured to determine the pitch angle of the rotor blades 106 to maximize output power (within the rated limits) and/or minimize tower oscillations. As noted previously, some of the previously known pitch controllers may tend to increase tower oscillations, instead of decreasing them. This increase in tower oscillations may be because conventional pitch controllers fail to account for the interdependence between rotor dynamics and tower dynamics.

Tower dynamics for the wind turbine 100, in one example, may be represented by a second order linear equation:

$$\ddot{X}_{fa} + 2\xi_{fa}\omega_{fa}\dot{X}_{fa} + X_{fa} = KF_z(\omega_r, \theta, v_e) \quad (1)$$

where, $\ddot{X}_{fa}$ is the tower top acceleration, $\xi_{fa}$ is the velocity-damping constant of the tower 102, $\omega_{fa}$ is the first mode tower resonant frequency, $\dot{X}_{fa}$ is the tower top velocity, and $X_{fa}$ is the tower deflection. Further, K is an inverse of a generalized mass for the first mode, $F_z$ is the aerodynamic thrust, $\omega_r$ is the angular velocity, $\theta$ is the pitch angle, and $v_e$ is the effective wind speed.

The effective wind speed ($v_e$) refers to the effective speed of the wind at the hub height of the wind turbine 100. Because the wind 110 is distributed spatially and temporally, the wind speed varies significantly at different points over the area swept by the rotor blades 106, and therefore different portions of the wind turbine 100 may experience different wind speeds. The effective wind speed ($v_e$) is representative of the difference between the mean wind speed ($v$) and the tower top velocity ($\dot{X}_{fa}$) as depicted in equation (2):

$$v_e = v - \dot{X}_{fa} \quad (2)$$

The left-hand side of equation (1) indicates that the motion of the tower 102 may be dependent on the tower top acceleration ($\ddot{X}_{fa}$), tower top velocity ($\dot{X}_{fa}$), tower deflection ($X_{fa}$), resonant frequency ($\omega_{fa}$), and velocity-damping constant ($\xi_{fa}$). In addition, the right-hand side of equation (1) illustrates that the aerodynamic thrust ($F_z$) experienced by the tower 102 may be a function of the angular velocity ($\omega_r$), the pitch angle ($\theta$), and the effective wind speed ($v_e$). Further, the aerodynamic thrust ($F_e$) may be a function of the mean wind speed ($v$) and the tower top velocity ($\dot{X}_{fa}$) as these parameters affect the effective wind speed ($v_e$).

Moreover, rotor dynamics for the wind turbine 100 may also be represented by a first order linear equation:

$$J_r\dot{\omega}_r = M_z(\omega_r, \theta, v_e) - NT_g \quad (3)$$

where, $J_r$ is a moment of inertia of the rotor 104, $\dot{\omega}_r$ is the rate of change in the angular velocity of the rotor, N is gearbox ratio, and $T_g$ is the generator reaction torque.

It will be noted that both the rotor dynamics and the tower dynamics depend on the effective wind speed ($v_e$). Further, it will be noted that the effective wind speed ($v_e$) is a function of the tower top velocity ($\dot{X}_{fa}$). Therefore, it is evident from equations (1) and (3) that the tower dynamics and the rotor dynamics are dependent on each other. In fact, these dynamics are related to each other because of the tower top velocity ($\dot{X}_{fa}$), rotor velocity ($\omega_r$), and pitch angle ($\theta$).

Conventional pitch controllers typically assume that the rotor dynamics and the tower dynamics are independent. Consequently, these pitch controllers generally ignore the tower top velocity while computing the pitch angle for controlling the rotor velocity and/or damping the tower oscillations. Moreover, because of this exclusion, conventional pitch controllers may cause instability in the rotor dynamics and energy amplification in the rotor velocity at frequencies close to the tower resonance. In one embodiment, the exemplary pitch control system 116 may be configured to employ the tower top velocity in the computation of the pitch angle. More particularly, the exemplary pitch control system 116 may be configured to deduct the effects of the tower top velocity from the rotor velocity. By including the tower top velocity and compensating for this value in the computation of the pitch angle, the exemplary pitch control system 116 may advantageously decouple the rotor dynamics and the tower dynamics.

Figure 2:
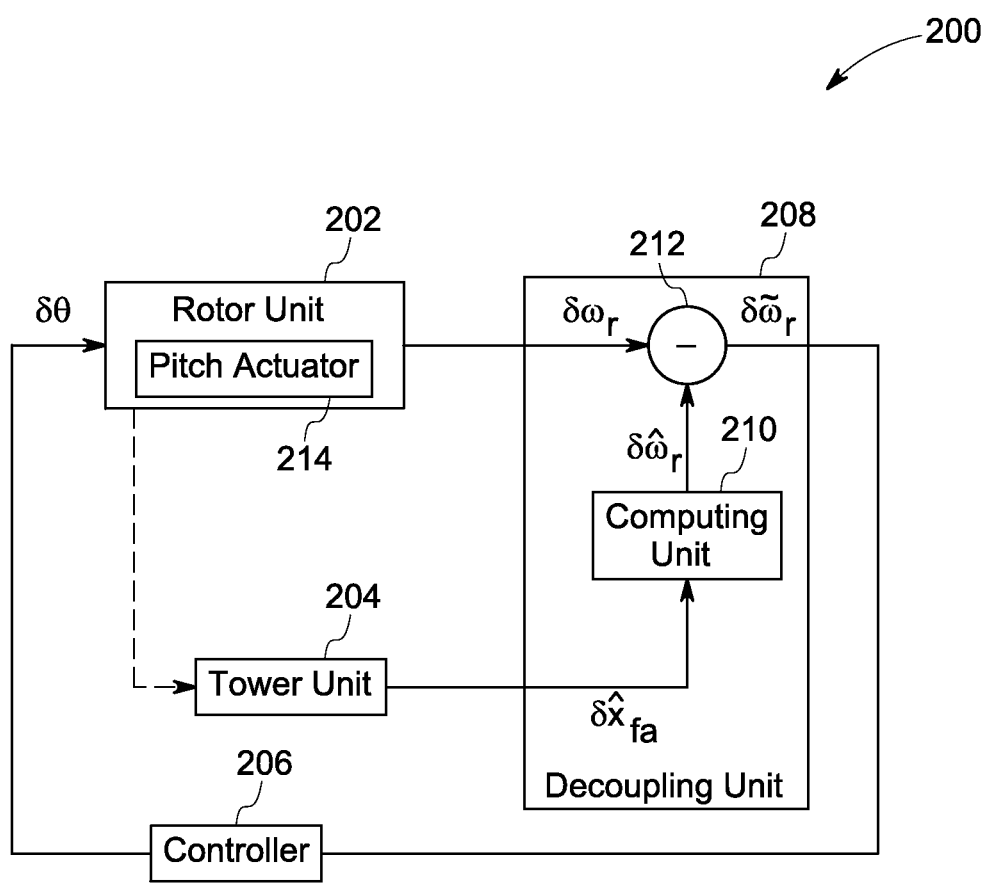
FIG. 2 is a diagrammatical representation of an exemplary pitch control system, according to aspects of the present disclosure.

FIG. 2 illustrates an exemplary embodiment 200 of the pitch control system 116 of FIG. 1, according to aspects of the present disclosure. The pitch control system 200 of FIG. 2 includes a rotor velocity control loop. Further, the pitch control system 200 may include a rotor unit 202, a tower unit 204, and a controller 206. Moreover, the pitch control system 200 may also include a decoupling unit 208. In one embodiment, the controller 206 may be disposed in a feedback loop of the rotor unit 202 and the decoupling unit 208 may be disposed at an output of the rotor unit 202 and the tower unit 204.

The rotor unit 202 may be configured to determine a rotor velocity ($\omega_r$). In one embodiment, the rotor unit 202 may be configured to determine the rotor velocity ($\omega_r$) by directly measuring the angular speed of the rotor 104 (see FIG. 1) using a sensing device such as a speedometer or an angular velocity meter. Alternatively, the rotor unit 202 may be configured to determine the rotor velocity ($\omega_r$) by determining a power output of the wind turbine 100 (see FIG. 1) or the rotation speed of a generator. It may be noted that these values are proportional to the rotor velocity. Accordingly, determination of any of these parameters may aid the rotor unit 202 in determining the rotor velocity. It will be understood that various models and measurement means may be employed to determine the rotor velocity and any of these models or means may be employed to determine the rotor velocity without departing from the scope of the present disclosure.

The tower unit 204 may be configured to determine one or more parameters associated with the tower 102. These parameters may be representative of the tower dynamics. For instance, in one embodiment of the pitch control system 200, the tower unit 204 may be configured to determine the tower top velocity ($\dot{X}_{fa}$). The tower top velocity ($\dot{X}_{fa}$) may be estimated using the tower top acceleration ($\ddot{X}_{fa}$). As previously noted, the accelerometer 112 (see FIG. 1) may be employed to sense the tower top acceleration and communicate this information to the tower unit 204. The tower unit 204 may be configured to perform any known computation to determine the tower top velocity ($\dot{X}_{fa}$). For instance, the tower unit 204 may be configured to determine the tower top velocity ($\dot{X}_{fa}$) by performing an integration operation on the tower top acceleration ($\ddot{X}_{fa}$). Alternatively, the tower unit 204 may determine the tower top velocity ($\dot{X}_{fa}$) from the tower acceleration ($\ddot{X}_{fa}$) using a model based estimator such as a Kalman Filter.

In other embodiments, the tower top velocity ($\dot{X}_{fa}$) may be estimated by a deflection sensor that detects a degree of deflection of the tower 102 about a determined rest position. By measuring the deflection at various instances of time, the tower top velocity ($\dot{X}_{fa}$) may be determined. In another embodiment, the tower unit 204 may be configured to perform a differentiation operation on the tower deflection to determine the tower top velocity ($\dot{X}_{fa}$). In yet another embodiment, the tower top velocity ($\dot{X}_{fa}$) may be directly sensed by a velocity sensor. It will be understood that the tower unit 204 may perform various other functions and operations without departing from the scope of the present disclosure. For example, the tower unit 204 may maintain and continuously update a model of the tower dynamics.

In accordance with aspects of the present disclosure, the decoupling unit 208 may be configured to determine a modified rotor velocity based on parameters of the tower 102. To this end, the decoupling unit 208 may include a computing unit 210 and a subtracting unit 212. The computing unit 210 may be configured to receive the parameters associated with the tower 102. By way of example, the computing unit 210 may be configured to receive the tower top velocity from the tower unit 204. Furthermore, the computing unit 210 may be configured to determine a rotor velocity component based on the tower top velocity (hereinafter referred to as the "first rotor velocity component"). The first rotor velocity component may be representative of the effect of the tower top velocity on the rotor velocity. To determine the first rotor velocity component, the computing unit 210 may utilize a linear model of the rotor dynamics. The rotor dynamics may be represented by the following first order linear equation:

$$\left(J_r \delta\dot{\omega}_r - \frac{\delta M_z}{\delta \omega_r} \delta\omega_r\right) = \frac{\delta M_z}{\delta\theta} \delta\theta_{wr} + \frac{\delta M_z}{\delta \upsilon}\left(\delta\upsilon - \delta\dot{X}_{fa}\right) \quad (4)$$

or approximations thereof, where $$\frac{\delta M_z}{\delta \omega_r}$$

is the partial derivative of the aerodynamic torque with respect to the rotor velocity, $$\frac{\delta M_z}{\delta \theta}$$

is the partial derivative or me aerodynamic torque with respect to the pitch angle, and $$\frac{\delta M_z}{\delta \upsilon}$$

is the partial derivative of the aerodynamic torque with respect to the mean wind velocity.

Further, a linear model of the rotor dynamics may be represented by the following equation:

$$\left(J_r \delta\dot{\omega}_{rf} - \frac{\delta M_z}{\delta \omega_r} \delta\omega_{rf}\right) = -\frac{\delta M_z}{\delta \upsilon} \delta\dot{X}_{fa} \quad (5)$$

or approximations thereof, where $\delta\dot{\omega}_{rf}$ is the rate of change of the first rotor velocity component and $\delta\omega_{rf}$ is the first rotor velocity component.

It may be noted that all the variables in equation (5), with the exception of the first rotor velocity component, may be detected and/or stored by the rotor unit 202 and/or the tower unit 204. The values of these variables may be communicated to the computing unit 210. The computing unit 210 may be configured to compute the first rotor velocity component based on the values of these variables.

Moreover, in one example, the computing unit 210 may be implemented as one or more digital filters. In another example, the computing unit 210 may be implemented as a general-purpose computing device. The general-purpose computing device may be selectively activated or reconfigured by a decoupling means/unit. For example, the computing device may store the rotor dynamics and the linearized model of the rotor dynamics in a non-transitory computer readable storage medium, such as, but not limited to, any type of disk, memory, magnetic card, optical card, or any type of media suitable for storing electronic instructions. Further, the computing device may store instructions or programs configured to compute the first rotor velocity component.

As described previously, the decoupling unit 208 may further include the subtracting unit 212 that may be configured to receive the rotor velocity ($\omega_r$) from the rotor unit 202 and the first rotor velocity component ($\delta\omega_{rf}$) from the computing unit 210. Moreover, the subtracting unit 212 may be configured to subtract the first rotor velocity component ($\delta\hat{\omega}_{rf}$) from the rotor velocity ($\omega_r$) to obtain a modified rotor velocity. The modified rotor velocity may be representative of the rotor velocity that is devoid of the effects of the tower top velocity.

The controller 206 may be configured to receive the modified rotor velocity, process this value, and generate a pitch angle value ($\delta\theta$) corresponding to the modified rotor velocity (hereinafter referred to as a "first pitch angle"). To process this value, in one embodiment, the controller 206 may include a lookup table (LUT) that includes previously computed pitch angle values corresponding to various rotor velocities. The modified rotor velocity may be compared with the stored rotor velocities to determine a corresponding first pitch angle. Alternatively, the controller 206 may include a threshold rotor velocity. In this case, the modified rotor velocity may be compared with a threshold rotor velocity. Further, the controller 206 may be configured to generate an error signal indicative of any deviation of the modified rotor velocity from the threshold rotor velocity. The controller 206 may further include a LUT to store pitch angle values corresponding to various error values. By performing a lookup in such a table, the controller 206 may be configured to determine an appropriate first pitch angle. In other embodiments of the controller 206, the first pitch angle may be computed in real time by utilizing one or more known wind turbine models that may be stored in an associated LUT.

In some instances, independent pitching of the rotor blades 106 may further reduce the oscillations and increase the efficiency of the wind turbine 100. In such instances, the controller 206 may be configured to independently determine first pitch angles for each rotor blade 106. Techniques for such computations may include receiving modified rotor velocities corresponding to each rotor blade 106 separately or receiving a single modified rotor velocity. In case of individual modified rotor velocities, the controller 206 may be configured to perform a simple lookup in the LUT to determine the individual first pitch angles. Otherwise, the controller 206 may be configured to utilize one or more wind turbine models to determine the individual first pitch angles. For example, during the turbine design phase, various calculations may be carried out to determine a model for defining the rotor velocity attained at various individual pitch angles and wind speeds. The results of such computations may be stored in the controller 206. Subsequently, during operation, the controller 206 may be configured to perform a lookup to determine the individual first pitch angles that may be utilized to attain the modified rotor velocity. Alternatively, the controller 206 may be configured to supply the modified rotor velocity, previous pitch angles, and current wind speed to the model to determine the individual first pitch angles. It will be understood that various pitch angle controllers are currently employed in wind turbines and that any of these pitch controllers may be utilized to implement the controller 206 without departing from the scope of the present disclosure. The controller 206 may be any of the controllers known in the art, such as a proportional controller, a proportional integral controller, a proportional-integral-derivative controller, a linear-quadratic regulator, or a linear-quadratic Gaussian regulator without departing from the scope of the present disclosure.

In some embodiments, the rotor unit 202 may include a pitch actuator 214 for pitching the rotor blades 106 based on the first pitch angle determined by the controller 206. As described previously, the controller 206 may be configured to generate and transmit substantially similar first pitch angles for the blades in the wind turbine 100 to the pitch actuator 214. Alternatively, the controller 206 may transmit independent first pitch angles to the pitch actuator 214. The pitch actuator 214, in turn, may include any actuation mechanism to adjust the pitch angle of the rotor blades 106. For example, the pitch actuator 214 may be a hydraulic system that receives pitch angle values in the form of voltage signals and pitches the rotor blades 106 by actuating a pitch cylinder (not shown) at a variable rate. Alternatively, the pitch actuator 214 may be an electrical, electronic, or electro-mechanical system without departing from the scope of the present disclosure.

It may be noted that FIG. 2 illustrates the decoupling unit 208 and the controller 206 as separate hardware units. However, it will be understood that in some embodiments, the controller 206 may be designed as a multi-input and multi-output (MIMO) controller that includes the functionality of the decoupling unit 208 and/or the rotor and tower units 202 and 204. In embodiments where the controller 206 includes the decoupling unit 208, the tower top velocity and the rotor velocity may be directly provided to the controller 206. The controller 206, in turn, may include the computing unit 210 and the subtracting unit 212 to compute the first rotor velocity component and subtract this value from the detected rotor velocity, respectively. Based on the subtraction, the controller 206 may determine the modified rotor velocity.

Figure 3:
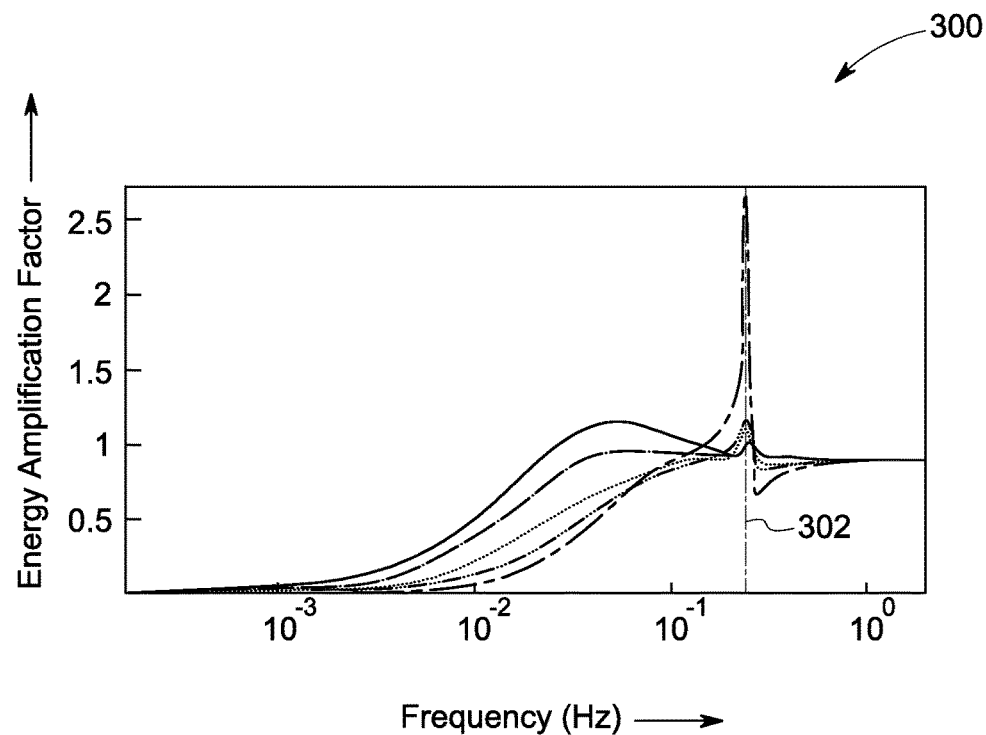
FIG. 3 is a graph illustrating energy amplification in rotor velocity of a conventional wind turbine at different wind speeds.
Figure 4:
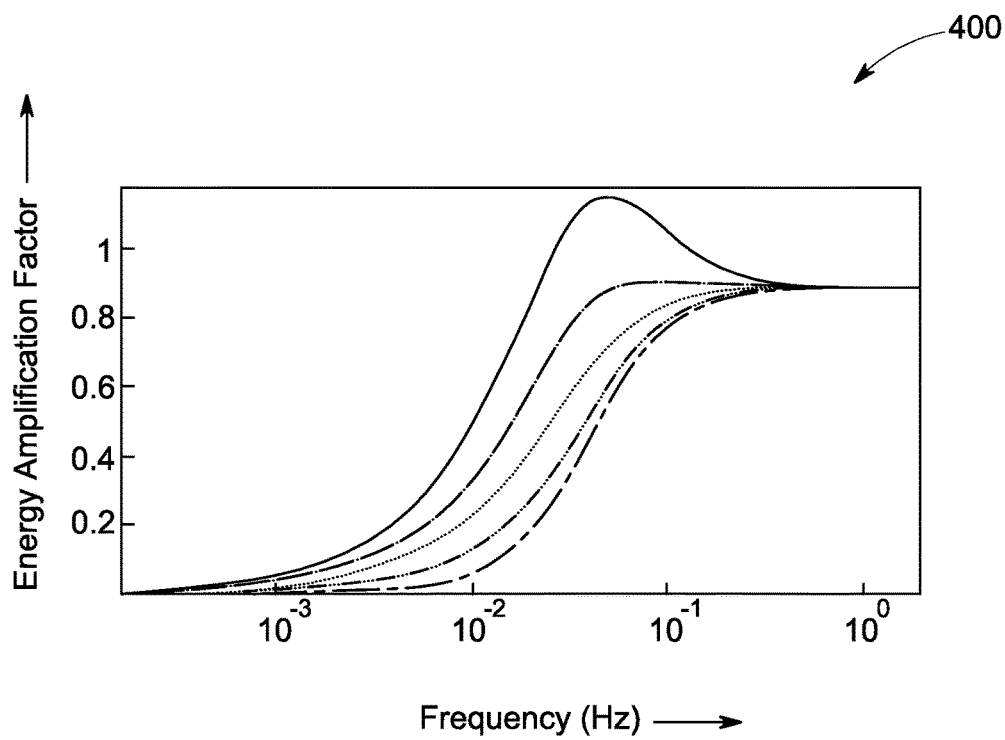
FIG. 4 is a graph illustrating energy amplification in rotor velocity of a wind turbine employing the exemplary pitch control system of FIG. 2 at different wind speeds, according to aspects of the present disclosure.

FIGS. 3 and 4 are graphs 300, 400 schematically illustrating simulated energy amplification in rotor velocity of a wind turbine, at various wind speeds. Further, these graphs 300, 400 illustrate the energy amplification of the rotor velocity using pitch angle as an actuator. More particularly, graph 300 illustrates the effect of a conventional pitch control system (without the decoupling unit) on the energy amplification in the rotor velocity of a conventional wind turbine at different wind speeds and frequencies. Graph 400 illustrates the effect of the exemplary pitch control system 200 of FIG. 2 on the energy amplification in the rotor velocity of the wind turbine 100 at different wind speeds and frequencies.

Graph 300 illustrates that there is significant energy amplification at the tower resonance frequency (generally indicated by reference numeral 302). In essence, such amplification occurs because conventional pitch controllers do not account for the tower top velocity while determining the pitch angle to control the rotor velocity.

To circumvent the shortcomings of the conventional pitch controllers, the exemplary decoupling unit 208 of FIG. 2 may be configured to prevent energy amplification and reduce fore-aft oscillations 114 (see FIG. 1) at tower resonance frequencies. In particular, the decoupling unit 208 may be configured to determine a rotor velocity component that results from the tower oscillations. Additionally, the decoupling unit 208 may be configured to deduct this component from the rotor velocity. Consequently, the effects of the tower oscillations on the rotor velocity may be substantially minimized. Accordingly, wind speed and pitch angle may be the only factors that affect the modified rotor velocity. Graph 400 illustrates this statement. It will be appreciated that the energy amplification of FIG. 3 is not present in FIG. 4. Therefore, introduction of the exemplary decoupling unit 208 in the pitch control system 200 aids in minimizing energy amplification and subsequent tower oscillations.

Figure 5:
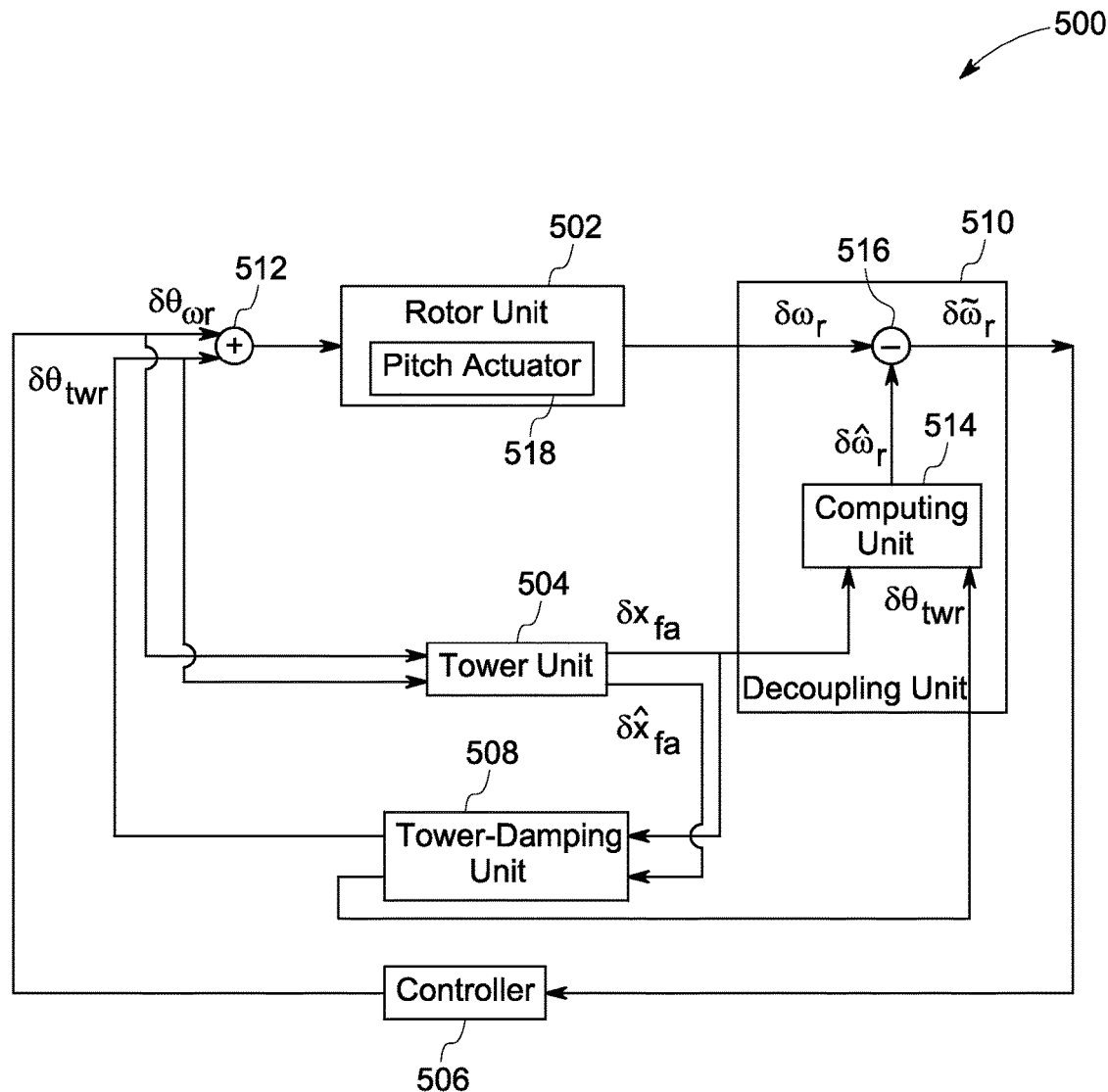
FIG. 5 is a diagrammatical representation of another exemplary pitch control system, according to aspects of the present disclosure.

FIG. 5 is a diagrammatical representation of another exemplary embodiment 500 of the pitch control system 116 of FIG. 1. In this embodiment, the pitch control system 500 includes a rotor velocity control loop and a tower-damping control loop. Accordingly, the pitch control system 500 includes a rotor unit 502, a tower unit 504, and a controller 506. These units function substantially similar to the similarly named units described with reference to FIG. 2. Furthermore, the pitch control system 500 may include a tower-damping unit 508, a decoupling unit 510, and an adder 512. The tower-damping unit 508 may be coupled between an output of the tower unit 504 and an input of the rotor unit 502. Also, the decoupling unit 510 may be coupled at an output of the rotor unit 502, tower unit 504, and the tower-damping unit 508. Further, the adder 512 may be coupled between an output of the controller 506 and the tower-damping unit 508, and an input of the rotor unit 502.

The tower-damping unit 508 may be configured to reduce the oscillations in the tower 102 of FIG. 1. As previously noted with reference to FIG. 1, these oscillations are typically caused by disturbances in the wind 110, operation of the rotor blades 106, or any other such factors. During operation of the wind turbine 100, a lift and a drag act on the rotor blades 106. The drag acts as a thrust in the front-rear direction of the tower 102, thereby inducing fore-aft oscillations 114. Moreover, the magnitude of the thrust varies depending on the wind speed and the pitch angle. Accordingly, by controlling the pitch angle, the thrust in the front-rear direction may be adjusted, which in turn regulates the fore-aft oscillations 114.

With continuing reference to FIG. 5, in accordance with some aspects of the present disclosure, the tower-damping unit 508 may be configured to calculate a pitch angle for generating a desired thrust on the rotor blades 106. In one example, the desired thrust may be representative of the thrust that may be applied on the rotor blades 106 to substantially minimize or cancel the oscillations of the tower 102. Further, the tower-damping unit 508 may determine the pitch angle based on the detected tower top acceleration. Subsequently, the adder 512 may add the pitch angle for damping (hereinafter referred to as the "second pitch angle") with the first pitch angle to generate a combined pitch angle. The combined pitch angle may be employed to pitch the rotor blades 106.

Despite reducing oscillations caused by the aerodynamic thrust ($F_z$), conventional tower dampers may introduce energy amplification in the rotor at tower resonance. This amplification may occur because conventional pitch controllers ignore the effects of the second pitch angle on the first pitch angle while computing the first pitch angle. In accordance with aspects of the present disclosure, embodiments of the pitch control system 500 account for the effects of the second pitch angle on the first pitch angle. In particular, the pitch control system 500 may be configured to deduct these effects along with the effects of the tower top velocity from the rotor velocity to determine a modified rotor velocity. By minimizing and/or removing the effects of the second pitch angle and the tower top velocity from the rotor velocity, embodiments of the pitch control system 500 aid in reducing or eliminating the possibility of energy amplification at tower resonance frequencies in the rotor 104 (see FIG. 1).

To obtain the modified rotor velocity, the decoupling unit 510 may be configured to determine components of rotor velocity based on one or more parameters associated with the tower 102, such as the tower top velocity and the second pitch angle. More particularly, the decoupling unit 510 may be configured to determine a component of rotor velocity due to the second pitch angle (hereinafter referred to as the "second rotor velocity component") in addition to the first rotor velocity component. Accordingly, the decoupling unit 510 may be configured to receive the tower top velocity from the tower unit 504 and the second pitch angle from the tower-damping unit 508. In one embodiment, the decoupling unit 510 may include a computing unit 514 and a subtracting unit 516. The computing unit 514 may be configured to determine the first rotor velocity component and the second rotor velocity component using a linearized model of the rotor dynamics, in one example. Accordingly, in this embodiment, the linearized model may include the second pitch angle in addition to the tower top velocity. The linearized model of the rotor dynamics may be represented by the following equation:

$$\left(J_r \delta\dot{\omega}_{rc} - \frac{\delta M_z}{\delta\omega_r}\delta\hat{\omega}_{rc}\right) = -\frac{\delta M_z}{\delta\upsilon}\delta\dot{X}_{fa} + \frac{\delta M_z}{\delta\theta}\delta\theta_{twr} \qquad (6)$$

or approximations thereof, where, $\delta\hat{\omega}_{rc}$ is a combination of the first rotor velocity component and the second rotor velocity component, $\delta\dot{\hat{\omega}}_{rc}$ is the rate of change of the combination of the first and second rotor velocity components, and $\delta\theta_{twr}$ is the second pitch angle.

The computing unit 514 may be configured to retrieve the second pitch angle and the tower top velocity from the tower-damping unit 508 and the tower unit 504, respectively. Based on these values, the computing unit 514 may be configured to determine a combination of the first and second components of the rotor velocity due to tower oscillations and tower damping. To determine the modified rotor velocity, the subtracting unit 516 may be configured to deduct the combination of the first and second rotor velocity components from the rotor velocity.

According to one embodiment, the decoupling unit 510 may be implemented as one or more digital filters or a computing device—one for determining the first rotor velocity component and the other for determining the second rotor velocity component. Alternatively, the decoupling unit 510 may be implemented as a single digital filter or computing device that may be configured to determine both the first and second rotor velocity components simultaneously.

The other units, such as the controller 506 and the rotor unit 502, may function in a manner that is substantially similar to the operation of their counterparts as described with reference to FIG. 2. For instance, the rotor unit 502 may be configured to communicate the detected rotor velocity to the subtracting unit 516. Similarly, the controller 506 may be configured to determine the first pitch angle and provide this value to the adder 512. Furthermore, the adder 512, in turn, may be configured to receive the first pitch angle and the second pitch angle and combine these two values to determine a combined pitch angle. This combined pitch angle may be communicated to a pitch actuator 518. Further, the pitch actuator 518 may be configured to pitch the rotor blades according to the communicated pitch angle.

Figure 6:
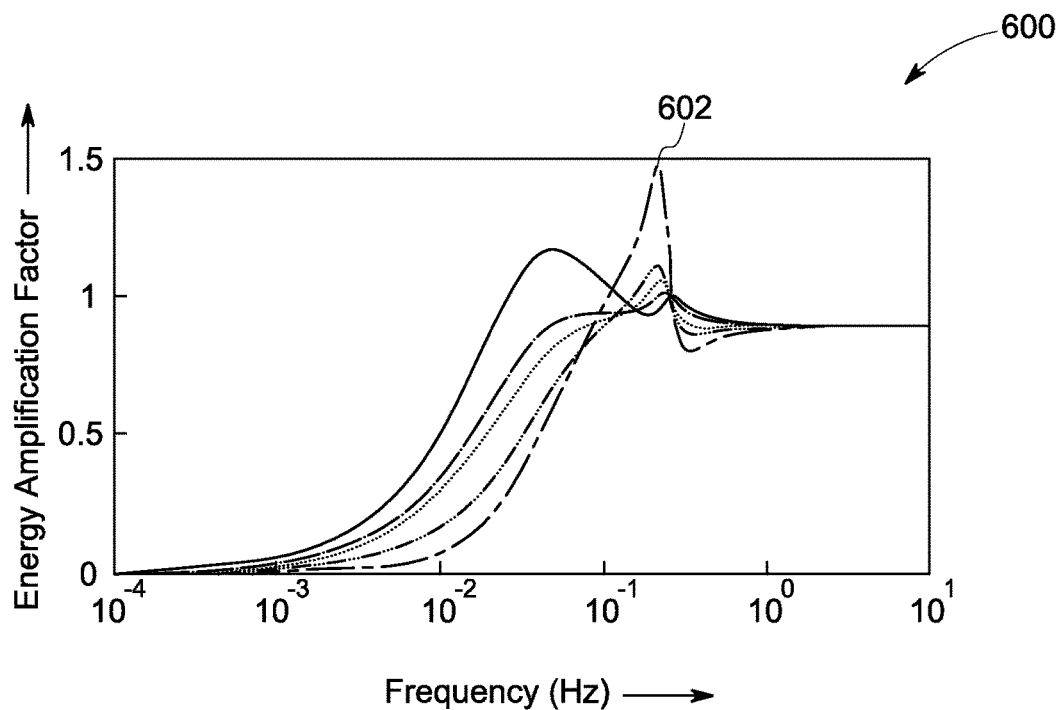
FIG. 6 is a graph illustrating energy amplification in rotor velocity of a conventional wind turbine with a tower-damping unit at different wind speeds.
Figure 7:
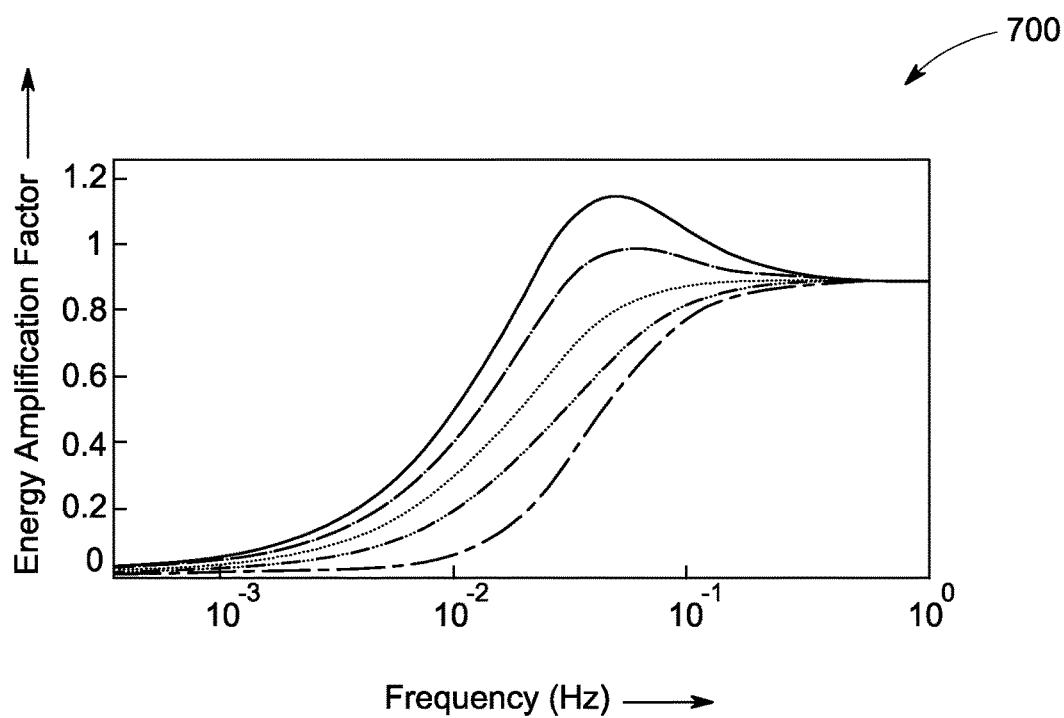
FIG. 7 is a graph illustrating energy amplification in rotor velocity of a wind turbine employing the exemplary pitch control system of FIG. 5 at different wind speeds, according to aspects of the present disclosure.

FIGS. 6 and 7 are graphs 600, 700 schematically illustrating simulated energy amplification in rotor velocity of a wind turbine. Further, these graphs 600, 700 illustrate energy amplification using pitch angle as an actuator. More particularly, FIG. 6 illustrates the effect of a conventional pitch controller (with a tower damping loop) on the energy amplification in the rotor velocity at different wind speeds and frequencies. FIG. 7 illustrates the effect of the exemplary pitch control system 500 of FIG. 5 on the energy amplification in the rotor velocity at different wind speeds and frequencies.

Graph 600 illustrates that there is significant energy amplification at the tower resonance frequency, generally represented by reference numeral 602. It may be noted that the energy amplification in this case is not as severe as in FIG. 3 due to the inclusion of a tower-damping loop in this conventional pitch controller. Graph 700 illustrates that the peak of the energy amplification indicated in FIG. 6 is significantly reduced by implementing the decoupling unit 510 of the pitch control system 500. Therefore, by introducing the decoupling unit 510, energy amplification at tower resonance frequencies may be prevented and excessive tower oscillations because of amplitude amplification may be circumvented.

Figure 8:
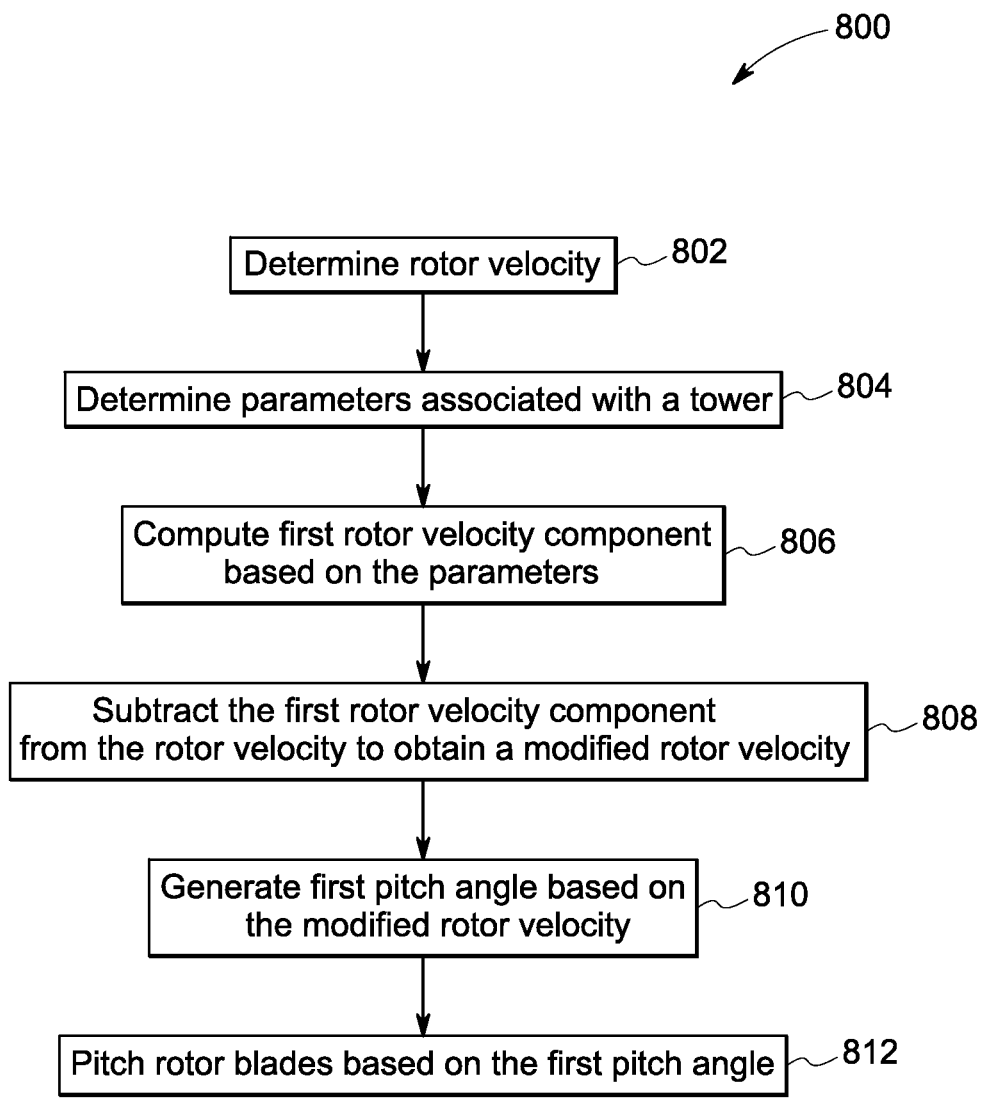
FIG. 8 is a flowchart illustrating an exemplary method for reducing tower oscillations in a wind turbine using the pitch control system of FIG. 2, according to aspects of the present disclosure.

FIG. 8 is a flow chart 800 that illustrates an exemplary method for reducing oscillations in a wind turbine. The method will be described with reference to FIGS. 1-2. The method begins at step 802 where a rotor velocity of a wind turbine, such as the wind turbine 100, is determined. In one embodiment, the rotor unit 202 may be configured to determine the rotor velocity by directly measuring the rotor velocity using a sensor, such as an anemometer, a speedometer, a rotational velocity meter, and so on. Alternatively, the rotor unit 202 may be configured to determine the rotor velocity by measuring an output power or generator speed of the wind turbine 100. In this case, the rotor velocity may be estimated as the velocity that generates the corresponding output power or generator speed.

Subsequently, at step 804, one or more parameters associated with a tower, such as the tower 102, may be determined. More particularly, a tower top velocity may be determined. In one embodiment, the tower unit 204 may be configured to determine the tower top velocity based on a tower top acceleration. The accelerometer 112 coupled to the wind turbine 100 may be employed to determine the acceleration of the tower deflections. Based on this detected value, the tower unit 204 may compute the tower top velocity. By way of example, the tower unit 204 may perform an integration operation on the tower top acceleration to determine the tower top velocity. Alternatively, the tower velocity may be determined from available measurements such as tower acceleration using a model-based estimator such as a Kalman filter. In other embodiments, a velocity sensor or a deflection sensor may be installed on the wind turbine 100 to measure the tower top velocity or the tower deflection, respectively. In case the tower deflection is detected, the tower unit 204 may be configured to perform a differentiation operation on the tower deflection to determine the tower top velocity. Furthermore, one or more of the sensors may be coupled to the tower unit 204 such that the measured parameter value may be directly provided to the tower unit 204.

Furthermore, at steps 806 and 808, a modified rotor velocity may be computed. To this end, a first rotor velocity component may be computed, as indicated by step 806. The computing unit 210 may be configured to utilize a linearized model of the rotor dynamics as represented by equation (5) to determine the modified rotor velocity. By substituting the tower top velocity and other variable values in equation (5), the computing unit 210 may determine the first rotor velocity component.

At step 808, the first rotor velocity component may be subtracted from the rotor velocity obtained at step 802 to determine the modified rotor velocity. In one embodiment, the subtracting unit 212 may be configured to perform this operation. The subtracting unit 212 may be a digital computing device or an electric hardware device without departing from the scope of the present disclosure. In case of a hardware device, the computing unit 210 may be configured to output an electrical signal corresponding to the first rotor velocity component. Similarly, the rotor unit 202 may convert the rotor velocity into an electrical signal. These signals (i.e., the first rotor velocity component and the rotor velocity) may then be subtracted in the subtracting unit 212. In the case of a digital computing device, the digital values for the rotor velocity and the first rotor velocity component may be provided to the subtracting unit 212 where these may be subtracted to determine the modified rotor velocity.

Subsequently, at step 810, a first pitch angle may be generated based on the modified rotor velocity. The subtracting unit 212 may be configured to communicate the modified rotor velocity to the controller 206. The controller 206, in turn, may be configured to determine the corresponding first pitch angle. As described previously, the controller 206 may be configured to perform this operation by utilizing any one of a number of known technologies. For instance, the controller 206 may include a prepopulated LUT that includes pitch angle values corresponding to various rotor velocities. Alternatively, the controller 206 may be configured to store a determined threshold rotor velocity, such as a rotor velocity that generates rated power output. The controller 206 may subsequently compare the modified rotor velocity with the threshold rotor velocity to generate an error signal. Furthermore, the controller 206 may also include a LUT that stores pitch angles corresponding to various error signals. Accordingly, the controller 206 may be configured to compare the generated error signal with the error signals in the LUT to determine an appropriate first pitch angle. Furthermore, in some wind turbines, the controller 206 may be configured to generate first pitch angle values for the rotor blades 106 individually so that each rotor blade 106 may be pitched at a different angle. In other embodiments, the controller 206 may generate one first pitch angle for all the rotor blades 106.

Following the determination of the first pitch angle, one or more rotor blades 106 may be pitched based on a corresponding first pitch angle, as indicated by step 812. To this end, the controller 206 may transmit the first pitch angle to the pitch actuator 214. The pitch actuator 214 may, in turn, be configured to utilize any known actuating means to alter the pitch angle of the blades. Some examples of pitch actuating means may include hydraulic means, electrical means, electronic means, and electro-mechanical means.

Figure 9:
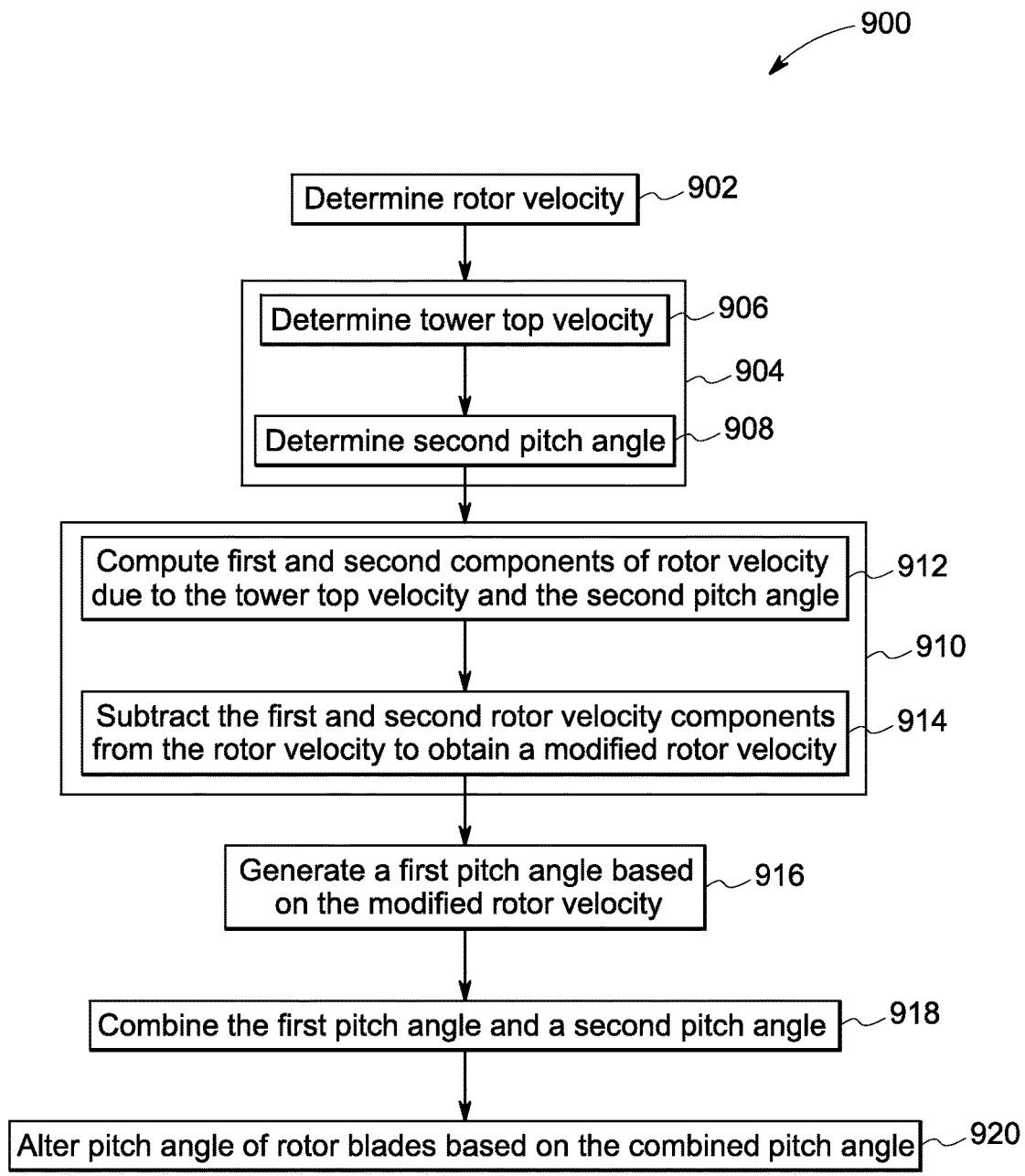
FIG. 9 is a flowchart illustrating an exemplary method for reducing tower oscillations in a wind turbine using the pitch control system of FIG. 5, according to aspects of the present disclosure.

FIG. 9 is a flow chart 900 illustrating another exemplary method for reducing oscillations in a wind turbine. This method is described with reference to FIGS. 1 and 5. Similar to the method previously described, this method begins at step 902 by determining the rotor velocity. Subsequently, at step 904, one or more parameters associated with the tower 102 may be obtained. The parameters may include tower top velocity and a second pitch angle. In one example, the tower top velocity may be determined at step 906 and the second pitch angle may be determined at step 908. To this end, the pitch control system 500 may include the tower-damping unit 508. The tower-damping unit 508 may be configured to determine the second pitch angle based on a linear model of tower dynamics and the tower top velocity. As described previously with reference to FIG. 5, the tower-damping unit 508 may be configured to determine the thrust required to reduce the oscillations and determine the second pitch angle that may aid in generating the desired thrust.

Once the second pitch angle is computed, a modified rotor velocity may be determined at step 910. To compute the modified rotor velocity, it may be desirable to obtain the first and second rotor velocity components. Accordingly, the first and second components of rotor velocity are computed, as indicated by step 912. In one embodiment, for this computation, the computing unit 514 may be configured to utilize the linearized model of rotor dynamics provided by equation (6). Using this equation, the computing unit 514 may be configured to determine a combination of the first and second rotor velocity components ($\hat{\omega}_{rc}$). In this model, the computing unit 514 may be configured to employ the values of the tower top velocity and the second pitch angle to determine the first and second components of rotor velocity. Subsequently, at step 914, the first and second components of rotor velocity are subtracted from the rotor velocity obtained at step 902 to determine the modified rotor velocity. In one embodiment, the combination of the first and second rotor velocity components ($\hat{\omega}_{rc}$) may be subtracted from the rotor velocity to determine the modified rotor velocity.

Furthermore, at step 916, a first pitch angle may be generated based on the modified rotor velocity. More particularly, the modified rotor velocity may be communicated to the controller 206 and the controller 206 may be configured to generate the first pitch angle. The first pitch angle and the second pitch angle may be combined in the adder 512 to generate a combined pitch angle, as indicated by step 918. This combined pitch angle may be transmitted to the pitch actuator 214. At step 920, the pitch actuator 518 may be configured to pitch the rotor blades 106 (individually or together) to obtain a desired rotor velocity and to reduce tower oscillations.

It will be understood that the methods of FIGS. 8 and 9 may be repeated continuously, periodically, or at determined intervals of time to maintain the desired rotor velocity and/or minimize tower oscillations. In case of high turbulence or very high speeds, these methods may not be sufficient to maintain the rotor velocity and/or the tower oscillations within threshold limits. In such cases, the pitch control system 116 may also be configured to power off or shut down the wind turbine 100 until the turbulent conditions pass. Such a measure may be taken to prevent damage to the wind turbine 100.

Furthermore, although the systems and methods described hereinabove decouple rotor and tower dynamics to reduce fore-aft tower oscillations and maintain effective rotor velocity, these systems may be utilized to decouple other wind turbine dynamics as well. For example, the decoupling unit 208 and/or 510 may be utilized in a pitch control system to decouple rotor blade-flap and tower fore-aft vibrations. Similarly, the decoupling unit 208 and/or 510 may be utilized in a torque controller to decouple blade-edge and drivetrain dynamics.

In addition, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine-readable media, such as on data repository chips, local or remote hard disks, optical disks (that is, CDs or DVDs), memory, or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a data repository or memory.

Moreover, the various lookup tables may be incorporated in any data repository system. For example, these lookup tables may be implemented in a read only memory, random access memory, flash memory, relational databases, or any other form of memory without departing from the scope of the present disclosure. Further, these lookup tables may be stored in a single data repository or in individual data repositories.

Conventional rotor velocity loops typically ignore parameters such as the tower top velocity ($\dot{X}_{fa}$) and the pitch angle calculated by the tower-damping loop ($\theta_{twr}$) while determining the pitch angle to control rotor velocity. Such disregard may induce energy amplification in the rotor at tower resonance frequencies. Sudden energy amplification may be detrimental for the rotor, drive train, and generator. Moreover, linear analysis reveals that the interdependence between the rotor dynamics and the tower dynamics results in unstable rotor dynamics. The exemplary rotor velocity loop of the pitch control system of the present disclosure effectively reduces/eliminates the effects of the tower dynamics on the rotor dynamics and therefore reduces energy amplification in the rotor at tower resonance. Moreover, the exemplary pitch control system may be employed to stabilize rotor dynamics. Further, the fatigue loads experienced by the wind turbines may also be reduced such that fatigue loads are within desired working limits. For example, the systems and methods described here may reduce tower fatigue by approximately 17%.

While only certain features of the invention have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A wind turbine, comprising:
a rotor comprising one or more rotor blades;
a tower operatively coupled to the rotor;
a pitch control system configured to reduce tower oscillations in the wind turbine, the pitch control system comprising:
  a rotor unit configured to determine a rotor velocity, wherein the rotor unit further comprises a pitch actuator configured to pitch one or more blades of the wind turbine based on the first pitch angle;
  a controller configured to determine a tower top velocity and a second pitch angle; and
  a decoupling unit configured to determine a modified rotor velocity based on the tower top velocity and the second pitch angle;
  wherein the controller is further configured to determine a first pitch angle based on the modified rotor velocity, and wherein the decoupling unit further comprises
    a computing unit configured to receive the tower top velocity from the rotor unit, receive the second pitch angle from the controller, determine a first rotor velocity component based on the tower top velocity, determine a second rotor velocity component based on the second pitch angle; and
    a subtracting unit configured to subtract the first rotor velocity component and the second rotor velocity component from the rotor velocity to determine the modified rotor velocity value, wherein the computing unit is further configured for determining the first rotor velocity component and the second rotor velocity component by utilizing a linear model of rotor dynamics, wherein the linear model is represented by:

$$\left(J_r \delta\dot{\omega}_{rc} - \frac{\delta M_z}{\delta \omega_r}\delta\omega_{rc}\right) = -\frac{\delta M_z}{\delta \upsilon}\delta\dot{X}_{fa} + \frac{\delta M_z}{\delta \theta}\delta\theta_{twr}$$

or approximations thereof, where $J_r$ is the moment of inertia of a rotor, $\delta\omega_{rc}$ is a combination of the first rotor velocity component and the second rotor velocity component, $\delta\dot{\omega}_{rc}$ is rate of change of the combination of the first rotor velocity component and the second rotor velocity component, $\delta\dot{X}_{fa}$ is the tower to velocity, and $\delta\theta_{twr}$ is the second pitch angle.

* * * * *